United States Patent [19]

Green et al.

[11] Patent Number: 5,586,253
[45] Date of Patent: Dec. 17, 1996

[54] METHOD AND APPARATUS FOR VALIDATING I/O ADDRESSES IN A FAULT-TOLERANT COMPUTER SYSTEM

[75] Inventors: Gregory M. Green, Boxborough; Steven Kohalmi, Newton; Karen R. Bricknell, Berlin, all of Mass.

[73] Assignee: Stratus Computer, Marlboro, Mass.

[21] Appl. No.: 356,561

[22] Filed: Dec. 15, 1994

[51] Int. Cl.$^6$ .................................................. G06F 11/00
[52] U.S. Cl. ........................ 395/185.06; 395/421.11; 395/411; 395/413
[58] Field of Search ............... 395/185.06, 185.07, 395/185.05, 406, 410, 411, 412, 413, 416, 421.08, 421.11; 371/51.1

[56] References Cited

U.S. PATENT DOCUMENTS

| | | | |
|---|---|---|---|
| 3,192,362 | 6/1965 | Cheney | 395/185.05 |
| 4,637,024 | 1/1987 | Dizon et al. | 371/185.06 |
| 4,677,546 | 6/1987 | Freeman et al. | 364/200 |
| 4,774,659 | 9/1988 | Smith et al. | 364/200 |
| 4,777,575 | 10/1988 | Strecker et al. | 364/200 |
| 4,942,519 | 7/1990 | Nakayama | 364/200 |
| 5,115,490 | 5/1992 | Konuro et al. | 395/400 |
| 5,276,823 | 1/1994 | Cuts, Jr. et al. | 395/575 |
| 5,321,706 | 6/1994 | Holm et al. | 371/51.1 |
| 5,357,615 | 10/1994 | Peek et al. | 395/275 |
| 5,371,868 | 12/1994 | Koning et al. | 395/400 |
| 5,392,302 | 2/1995 | Kemp et al. | 371/51.1 |
| 5,404,361 | 4/1995 | Casorso et al. | 395/185.05 |
| 5,426,747 | 6/1995 | Weinreb et al. | 395/400 |
| 5,440,710 | 8/1995 | Richter et al. | 395/417 |
| 5,449,849 | 10/1995 | Bergkvist, Jr. et al. | 395/403 |
| 5,463,755 | 10/1995 | Dumarot et al. | 395/425 |

*Primary Examiner*—Robert W. Beausoliel, Jr.
*Assistant Examiner*—Joseph E. Palys
*Attorney, Agent, or Firm*—Cesari and McKenna

[57] ABSTRACT

A novel mapping and protection circuit arrangement comprises a plurality of checking mechanisms that collectively cooperate to verify the accuracy of I/O addresses generated by input/output (I/O) controllers of a fault-tolerant computer. These verified I/O addresses are translated into system addresses to enable direct memory access (DMA) transactions between the controllers and the computer's host memory. Specifically, certain of the checking mechanisms cooperate to ensure that the DMA accesses are directed to correct pages in host memory, while other checking mechanisms are provided to ensure that memory access operations are performed at correct locations within the page. Additional checking mechanisms are provided to further verify the accuracy of generated I/O addresses.

2 Claims, 15 Drawing Sheets

900

| BE_[3] | BE_2] | BE_[1] | BE_[0] |
|---|---|---|---|
| 0 | 1 | 0 | X |
| 0 | 1 | X | 0 |
| 0 | X | 1 | 0 |
| X | 0 | 1 | 0 |
| 1 | 1 | 1 | 1 |

*FIG. 9*

METHOD AND APPARATUS FOR VALIDATING I/O ADDRESSES IN A FAULT-TOLERANT COMPUTER SYSTEM

BACKGROUND OF THE INVENTION

1. Field of the Invention

The present invention relates generally to computer systems and, in particular, to validation of input/output (I/O) addresses in a fault-tolerant computer system.

2. Description of the Related Art

An input/output (I/O) adapter permits a central processing unit (CPU) and a host memory of a computer system to exchange information with I/O devices, such as disks and networks. These I/O devices are typically connected to the host memory via a data channel that is configured to transfer I/O data to/from specific address locations in host memory.

Typically, I/O data are organized into blocks of contiguous data in host memory prior to processing by the CPU. For instance, in the case of input data, all bytes comprising a data block are accumulated in host memory before the CPU processes that block. Similarly, the CPU prepares in host memory a full block of data prior to transmitting to an I/O device any word of that block. To obtain maximum performance of the computer system, data transfer between these components must be controlled and synchronized.

One known approach to controlling the transmission of I/O data is program-controlled I/O. Under such a scheme, the CPU directs the input and output activity of the system by communicating with an I/O controller to direct the transfer of data between an I/O device and a register of the CPU. However, the program-controlled scheme tends to impose high overhead because of protracted involvement on behalf of the CPU. For example, the CPU must issue an initiation command followed by a series of completion tests to the controller along with, as the case may be, a transfer between its register and host memory for each word of data transferred.

Direct Memory Access (DMA) is a technique for reducing CPU involvement during the transfer of data by allowing transmission directly between the I/O device and host memory. Unlike programmed I/O, the CPU does not direct the transfer of data to/from its register and host memory. Instead, a separate, special-purpose DMA controller operates in conjunction with the I/O controller to administer the exchange of I/O data. Specifically, the DMA controller generates system addresses from I/O addresses so as to facilitate movement of data into and out of host memory, while the I/O controller reads and writes the data to the disk or network.

A fault-tolerant computer system is generally composed of specially designed components having improved tolerance to faults that enable their continuous operation. Examples of such specially designed components are an I/O adapter having a duplicated memory for "buffering" and checking all I/O information, and separate, duplicated DMA controller boards for verifying the accuracy of generated system addresses. These components simulate an intermediate staging area where duplicate copies of the data and addresses are temporarily stored and compared on a bit-by-bit basis. By ensuring the accuracy of the data/addresses, this arrangement prevents overwriting and corruption of valid information in host memory if, e.g., the DMA controller's address generation logic is faulty.

FIG. 1 is a schematic illustration of a prior art computer system 100 configured to implement the fault-tolerant DMA technique described above. The system 100 comprises an I/O adapter 140 coupled to a plurality of CPUs 102a,b (hereinafter 102) by way of duplicated DMA controller boards 120a,b (hereinafter 120). The I/O adapter 140 includes a plurality of I/O controllers (IOC) 142 and 144, each of which directs the operation of an associated I/O device. For the prior art embodiment shown in FIG. 1, IOC 142 controls the operation of disk 152 over line 154 and IOC 144 directs the operation of network 156 over line 158.

The IOCs are connected to duplicate memories 150a,b (hereinafter 150) by an internal bus 146. Each of the duplicate memories 150 is coupled to a discrete DMA controller board 120 via a respective I/O bus 130a,b. The DMA controller boards 120 contain address generation logic circuits 122a,b (hereinafter 122) for generating system addresses needed to access locations within host memories 104a,b (hereinafter 104) of the CPUs 102 over system buses 110a,b, respectively.

In accordance with the fault-tolerant DMA technique, the CPUs 102 initiate a transfer of a block of data, i.e., a DMA transaction, by first instructing the I/O adapter 140 to read the status of a specific I/O device and ensure that the device is prepared to accept data transfer commands. If status checking reveals a ready state, the CPUs 102 issue an appropriate initiation command to the DMA controllers 120. For example, if a data block is to be read from a disk, the command specifies a read operation and the location on disk of the data block to be transferred.

As noted, the CPUs are no longer involved in the transaction; accordingly, the DMA controllers must be provided with sufficient information so that they can execute the read/write operations on their own. This information typically consists of a starting address and a word count. The starting address specifies the host memory address at which the first data word is to be written or read and the word count indicates how many data words are to be transferred. Since the data block is expected to occupy contiguous memory locations, the memory addresses for subsequent data words are generated by incrementing (or decrementing) the current memory address. After transmitting the above parameters, the CPUs issue to the DMA controllers a start command. At this point, the CPUs are free to undertake other useful tasks and responsibility for the data block transfers are left to the DMA controllers.

Specifically, the DMA controllers 120 provide the appropriate I/O addresses to the I/O controller, which proceeds to acquire and place the data into the duplicated memories 150. Each DMA controller retrieves a copy of the data from a respective memory 150 and examines the data and their I/O addresses to verify their accuracy. Thereafter, the DMA controllers generate system addresses using the address generation logic 122 in connection with the associated I/O addresses, the starting host memory address and the number of words to be moved. The controller boards 120 then compare their generated addresses and, if correct, proceed to move the data into the proper host memory addresses.

After each word transfer, the DMA controllers examine the word count and if it is greater than 0, the controllers transfer the next word. A zero count is indicative of the fact that the number of specified words has been transferred; consequently, the DMA transaction is completed.

Although this duplicate hardware checking arrangement (e.g., duplicate memories 150, DMA controllers 120 and address generation logic 122) provides assurances that the data and addresses written to host memory are correct, the use of discrete, redundant hardware is costly and inefficient.

A more effective arrangement comprises inserting the address generation logic onto the I/O adapter, integrating the DMA controller circuitry with the I/O controllers and eliminating the duplicate memories. The resulting embedded DMA "engines" obviate the need for separate DMA controller boards, while elimination of the duplicate memories reduces the latency associated with buffering of the I/O data.

However, the lack of discrete, redundant checking hardware generally inhibits identification of incorrectly generated I/O addresses and their mapped system addresses that may corrupt host memory. The present invention is directed towards protecting host memory by verifying the accuracy of the addresses generated by these embedded DMA engines prior to accessing the host memory.

DESCRIPTION OF THE INVENTION

Summary of the Invention

Briefly, the present invention resides in a novel mapping and protection circuit arrangement comprising a plurality of checking mechanisms that collectively cooperate to verify the accuracy of I/O addresses generated by input/output (I/O) controllers of a fault-tolerant computer. These verified I/O addresses are translated into system addresses by direct memory access (DMA) engines embedded within the I/O controllers to enable DMA transactions between the controllers and the computer's host memory.

Address translation is preferably performed on fixed-length blocks of information, i.e., pages, using a plurality of mapping page tables. In accordance with one aspect of the present invention, certain of the checking mechanisms cooperate to ensure that the DMA accesses are directed to correct pages in host memory. For example, an I/O controller generates an I/O virtual address (IOVA) which is translated into a system address using a particular mapping table. The IOVA includes an index field whose contents provide a reference into the mapping table. The reference identifies a mapping table entry containing a portion of the system address that "points" to a specific page in host memory; this entry is thereafter stored in a cache along with a copy of the contents of the index field. A checksum field is also included within the IOVA, the checksum field containing a value that is derived from the index.

According to the "page" checking aspect of the arrangement described herein, a first mechanism comprises regenerating the checksum from the contents of the index field and comparing this regenerated value with the contents of the IOVA checksum field. A match verifies the integrity of the index. In addition, a second cooperating mechanism tests the state of a validity bit stored within the table entry and compares the "cached" index with the IOVA index. If the validity bit is asserted and if the indexes match, the mapping table entry is valid.

Once it is established that the correct page in host memory is identified, further checking mechanisms are provided to ensure that memory access operations are performed at correct locations within the page. As noted, the page table entry contains a portion of the system address that references a page in host memory; the entry also contains starting and ending page offsets that identify a range of valid addresses within that page. Similarly, the generated IOVA includes a page & line offset that points to an address in host memory for executing the DMA transaction.

In accordance with a "boundary" checking aspect of the invention, a third mechanism is provided for comparing the page & line offset with the starting and ending offsets. If the page & line offset is greater than or equal to the starting offset, and if it is less than or equal to the ending offset, then the page & line offset is correctly within the boundaries of the starting and ending offsets.

Accesses to memory locations during a DMA transaction typically occur sequentially as opposed to randomly. That is, each read/write access is to a word (i.e., 4 bytes) address and multiple accesses within a transaction should proceed from an initial address to an ending address without skipping or overwriting any intervening address locations. According to a "sequential access" checking aspect of the invention, the initial page & line offset is loaded into a counter which increments upon each transferred word so as to operate in tandem with the current page & line offset. A fourth mechanism compares the output of the counter with that current page & line offset value and, if a match ensues, further verifies the integrity of that offset value.

Moreover, two additional checking mechanisms are provided to verify the accuracy of generated I/O addresses. The host memory is a byte-addressable memory and the two least significant bits of the IOVA represent byte-enable signals. A fifth mechanism of the present inventive arrangement examines these byte-enable signals to ensure that they represent valid combinations and, if so, verify that they enable access to legal byte locations within each word.

Upon successful completion of the sequential DMA accesses from the specified starting page offset to the ending page offset, a sixth mechanism automatically invalidates the mapping table entry and cached entry by deasserting the validity bit. This "auto-invalidate" aspect of the invention provides a performance enhancement by obviating the need for software intervention to invalidate the entry in addition to preventing further access by the IOC to that index location.

In summary, the novel checking mechanisms of the mapping and protection circuit arrangement cooperate to provide fast and efficient verification of I/O addresses and their mapped system addresses without the need for discrete redundant checking circuits. Accordingly, the invention described herein guards against the corruption of valid information stored in host memory during DMA transactions.

BRIEF DESCRIPTION OF THE DRAWING

For a better understanding of the nature and objects of the invention, reference should be had to the following detailed description, taken in connection with the accompanying drawing, in which:

FIG. 9 is a table showing various illegal byte-enable combinations used by the mapping and protection circuit arrangement of the present invention;

DETAILED DESCRIPTION OF AN ILLUSTRATIVE EMBODIMENT

Figure 1:
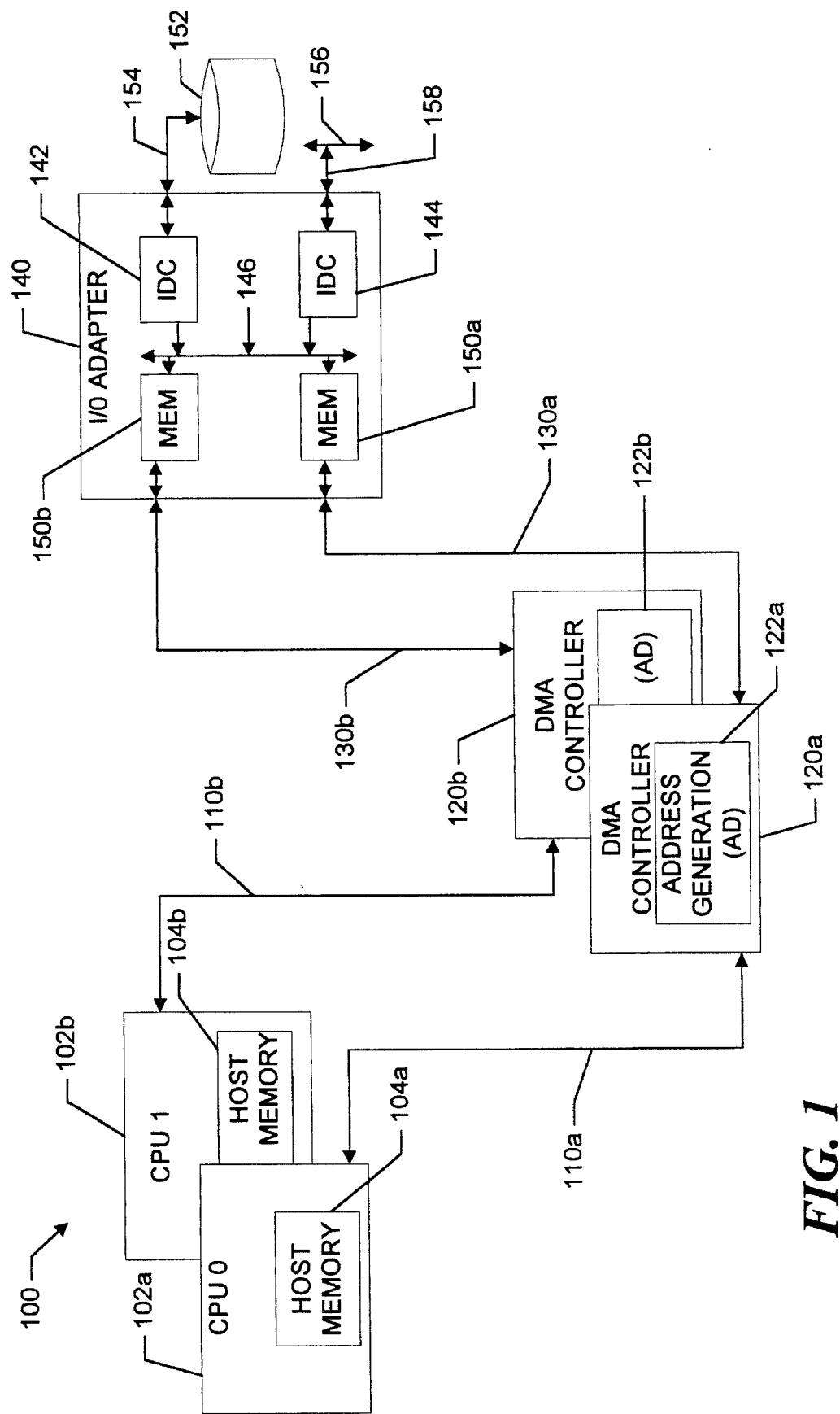
FIG. 1 is a schematic block diagram of a prior art fault-tolerant computer system configured to execute direct memory access (DMA) transactions.
Figure 2:
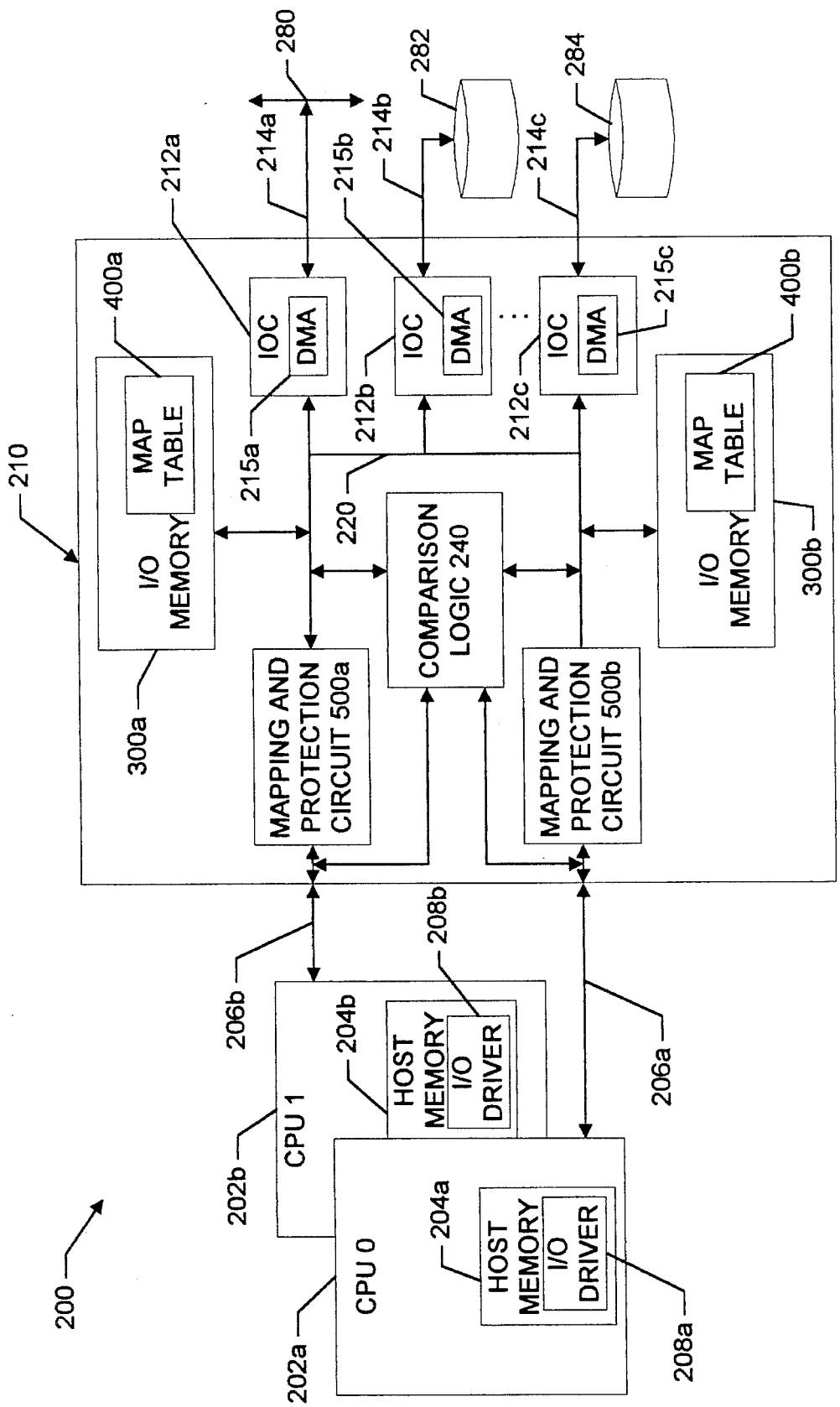
FIG. 2 is a schematic block diagram of a fault-tolerant computer system configured to execute DMA transactions in accordance with a novel mapping and protection circuit arrangement of the present invention.

FIG. 2 depicts relevant components of a fault-tolerant computer system 200 including a plurality of central processing units (CPU) 202a,b (hereinafter 202) connected to an input/output (I/O) adapter 210 over system buses 206a,b (hereinafter 206). Each bus 206 is a high speed, bi-directional, multiplexed address/data bus that preferably synchronizes and sequences communication among the CPUs and I/O adapter.

The CPUs 202 include host memories 204a,b (hereinafter 204), each of which comprises an array of memory devices for storing program information, i.e., data and instructions, in addressable storage locations. The CPUs execute these programs by fetching and interpreting the instructions, and processing the data in accordance with the instructions.

The host memories also store portions of an operating system including a collection of utility programs that control the execution of application programs and manage the transfer of information among the components of the fault-tolerant computer 200. One of these utility programs comprises I/O driver software 208a,b (hereinafter 208) that controls the I/O adapter when performing I/O operations, such as the transfer of information between the host memories 204 and various I/O devices 280–284. As described herein, information transfer between the host memories and I/O devices takes place in accordance with direct memory access (DMA) transactions over buses 206.

The I/O adapter 210, in turn, comprises a plurality of I/O controllers (IOC) 212a–c (hereinafter 212) that direct the operations of respective I/O devices 280–284 over lines 214a–c. In the illustrative embodiment, there are five IOCs configured to control various I/O devices such as Ethernet networks and small computer systems interface (SCSI) devices. The IOCs 212 have DMA circuitry 215a–c integrated therein for administering the exchange of I/O data between the devices 280–284 and host memories 204 in accordance with DMA transactions. These IOCs and their embedded DMA "engines" (hereinafter 215) are connected to duplicate mapping and protection circuits 500a,b (hereinafter 500) and I/O memories 300a,b (hereinafter 300) over local bus 220. These latter elements of the adapter 210 are configured such that each mapping and protection circuit 500 is associated with a respective I/O memory 300.

As a component of fault-tolerant computer system 200, the I/O adapter includes circuitry intended to improve its tolerance to faults that may occur during I/O operations. Such "fault-tolerance" is manifested as a "protected" environment whereby two copies of the data exiting the IOCs are produced and thereafter compared against each other. Comparison logic circuit 240 provides this feature of the invention by coupling portions of the local bus 220 and system buses 206 to enable comparison operations, on a bit-by-bit basis, with the address/data information flowing in and out of the I/O adapter 210.

Among the responsibilities of the adapter is the generation of 32-bit I/O addresses, i.e., I/O virtual addresses (IOVA), by the IOCs and I/O driver 208 for accessing locations on the I/O devices 280–284. The embedded DMA engines 215 within IOCs 212 operate to translate these generated IOVAs to system addresses for accessing locations within host memories 204. Address translation is preferably performed in connection with the mapping and protection circuits 500 and mapping tables 400a,b (hereinafter 400) stored within the I/O memories 300.

Figure 3:
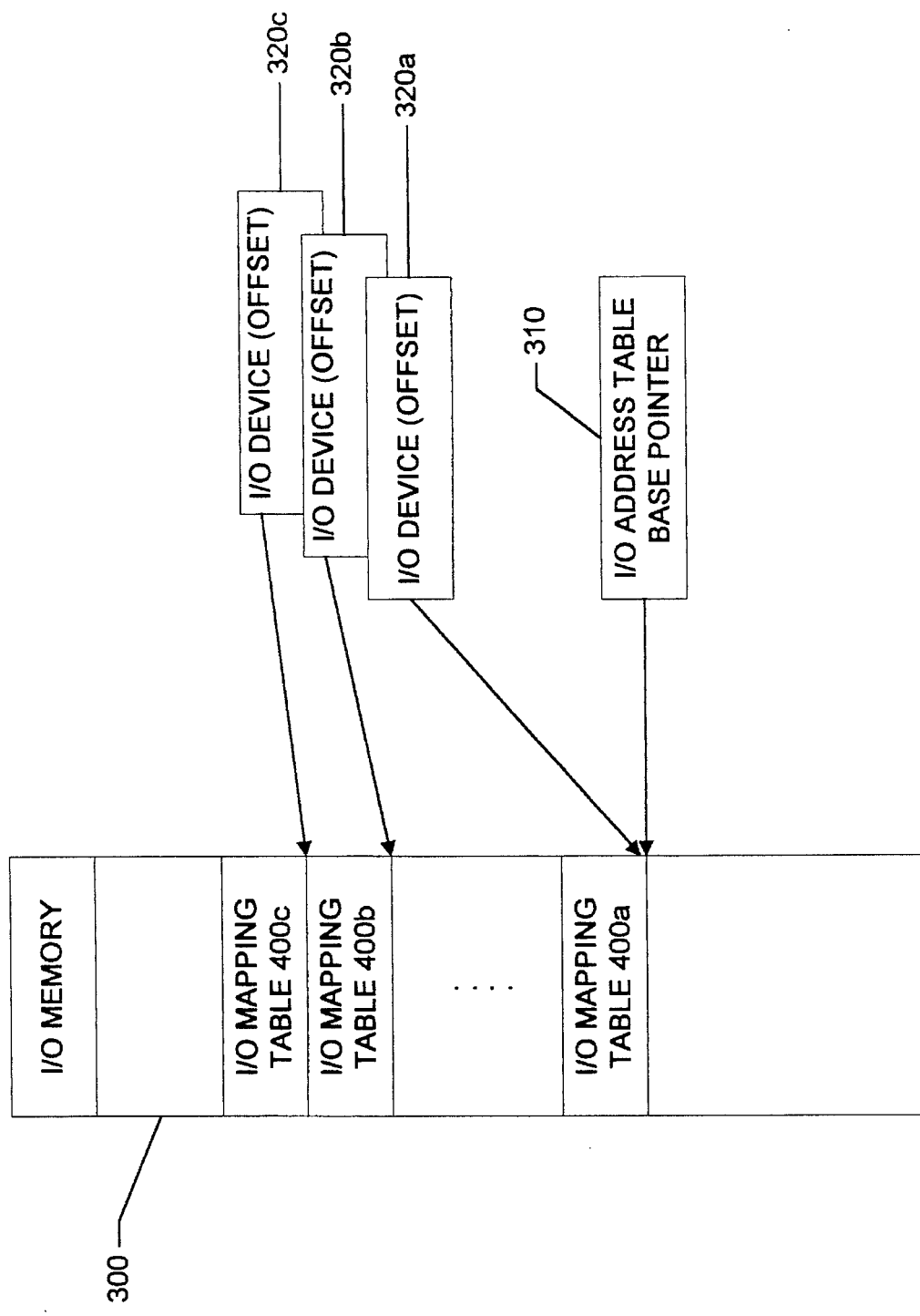
FIG. 3 is a schematic diagram illustrating the organization of an input/output (I/O) memory configured to store mapping page tables used in connection with the novel mapping and protection circuit arrangement.

FIG. 3 is a schematic diagram illustrating the organization of I/O memory 300 to accommodate mapping tables 400. The IOCs 212 are preferably assigned unique ("hard-wired") I/O device offset values 320a–c (hereinafter 320) that associate each IOC with its own mapping table 400. In addition, an I/O address table base pointer 310, which is preferably stored in a register of the mapping and protection circuit 500, references the location of the tables in memories 300. Together, these values direct an IOC to the starting address of its associated table 400. The pointer 310, the device offset values 320 and the tables 400 (and their contents) are all initialized by the I/O driver software 208 prior to DMA accesses with host memories 204.

Figure 4:
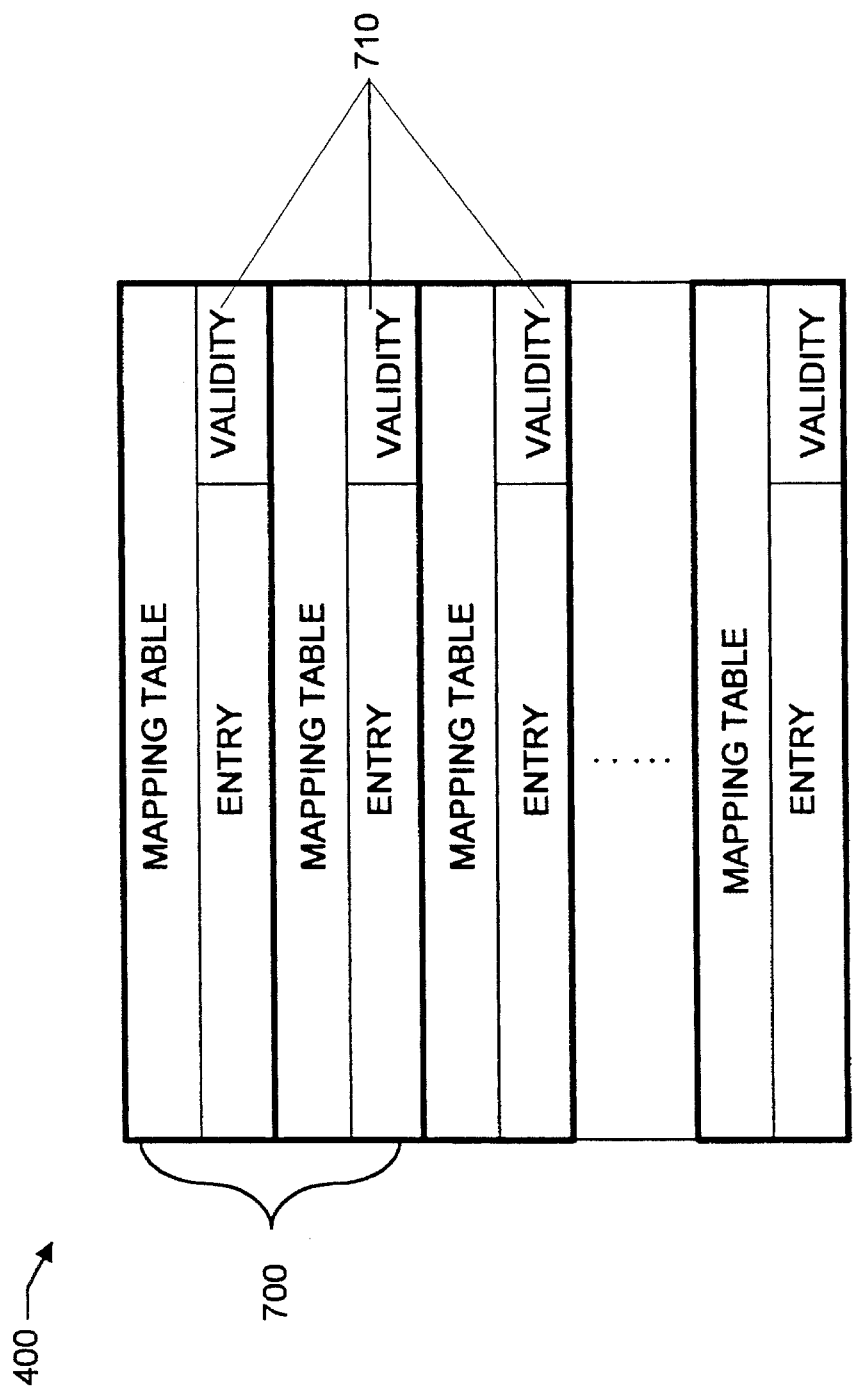
FIG. 4 is a schematic diagram of a mapping page table containing a plurality of mapping table entries used in accordance with the novel mapping and protection circuit arrangement.

FIG. 4 is a schematic diagram illustrating a mapping table 400 organized to store a plurality of mapping table entries 700. In the illustrative embodiment described herein, there are preferably four thousand (4K) mapping table entries 700 stored in the table 400. Address translation, i.e., mapping of addresses, is preferably performed on a page-by-page basis using the contents of these entries. Moreover, in accordance with the invention, these contents are logically processed in a manner that provides verification of the IOVAs generated by the IOCs 212. The contents of each entry 700, which are described further in connection with FIG. 7, include a validity bit 710 that indicates whether the current entry contains valid information.

Figure 5:
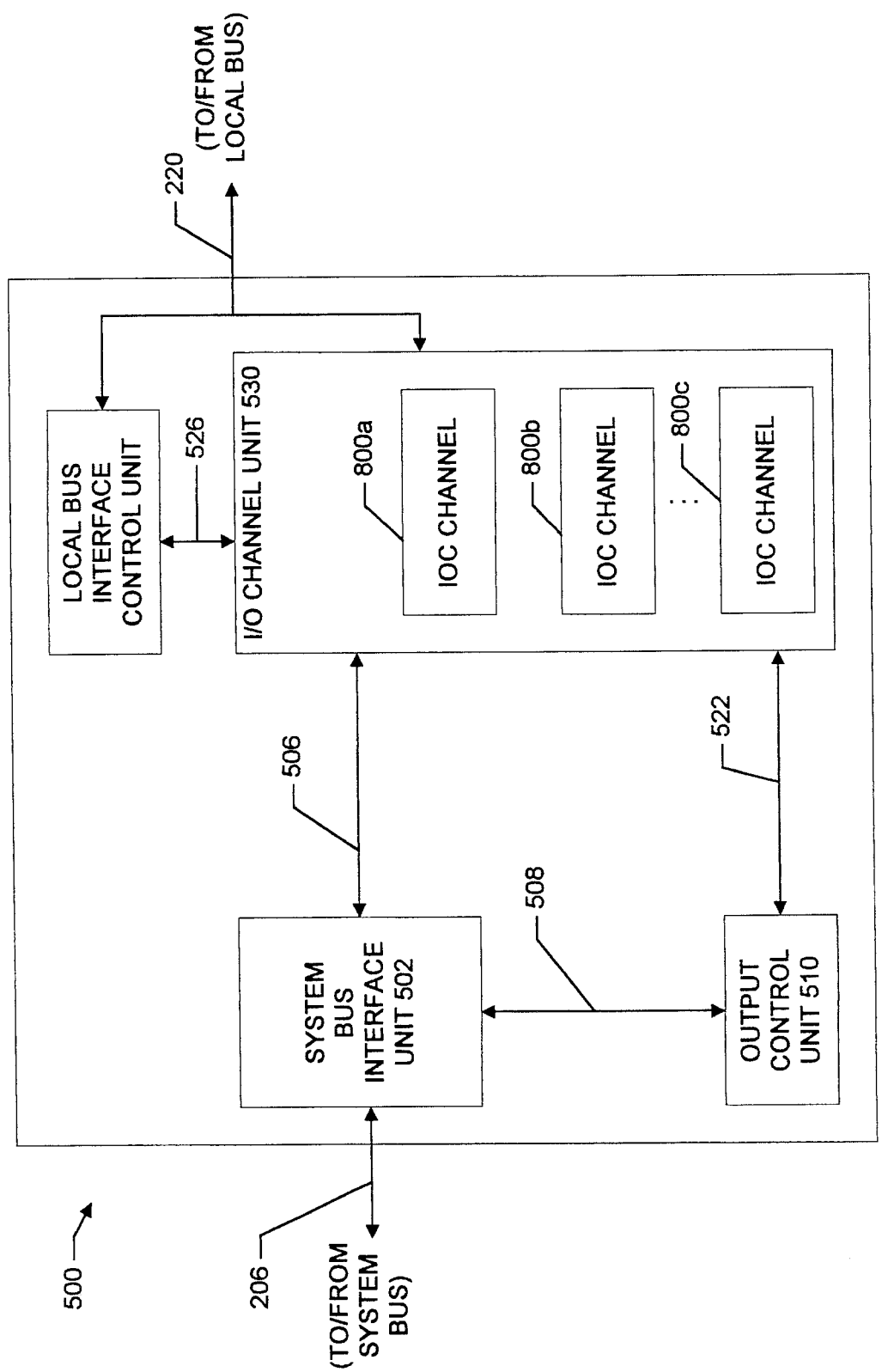
FIG. 5 is a schematic block diagram of the novel mapping and protection circuit arrangement in accordance with the invention.

FIG. 5 is a schematic block diagram of the mapping and protection circuit 500 configured to translate the 32-bit IOVA to a 48-bit system address. The mapping and protection circuitry comprises a plurality of interconnected units, such as an I/O channel unit 530, a system bus interface unit 502, an output control unit 510 and an IOC bus interface control unit 520. Collectively, these units acquire access to the system and local buses, monitor current transactions over the buses and maintain state information pertaining to pending transactions when relinquishing control of those buses.

Specifically, the system bus interface 502 contains the data path logic and physical connections needed to insure that the I/O adapter 210 meets the timing and electrical characteristics required to communicate on the system bus 206. In particular, the interface 502 includes the circuitry needed to arbitrate for the bus 206 and, upon gaining access, generate appropriate control signals for transferring system addresses and associated data to host memory 204 over the bus 200. The output control unit 510 provides a common logical channel interface between the system bus interface 502 (via line 508) and the I/O channel unit 530 (via line 522), while the IOC bus interface control unit 520 provides arbitration and control for all I/O operations/transactions on the local bus 220.

The heart of the mapping and protection circuit 500 is the I/O channel unit 530 which provides temporary storage for I/O information passing between the I/O devices 280–284 and host memories 204. To this end, the channel unit 530 includes a plurality of IOC channels 800a–c (hereinafter 800), each of which is associated with a respective IOC 212. These IOC channels generally comprise state machines and registers which, in accordance with the principles of the invention, facilitate system address mapping and verification of the IOVAs. A more detailed description of the mapping and verification operations are provided below in connection with FIGS. 8 and 10.

Figure 6:
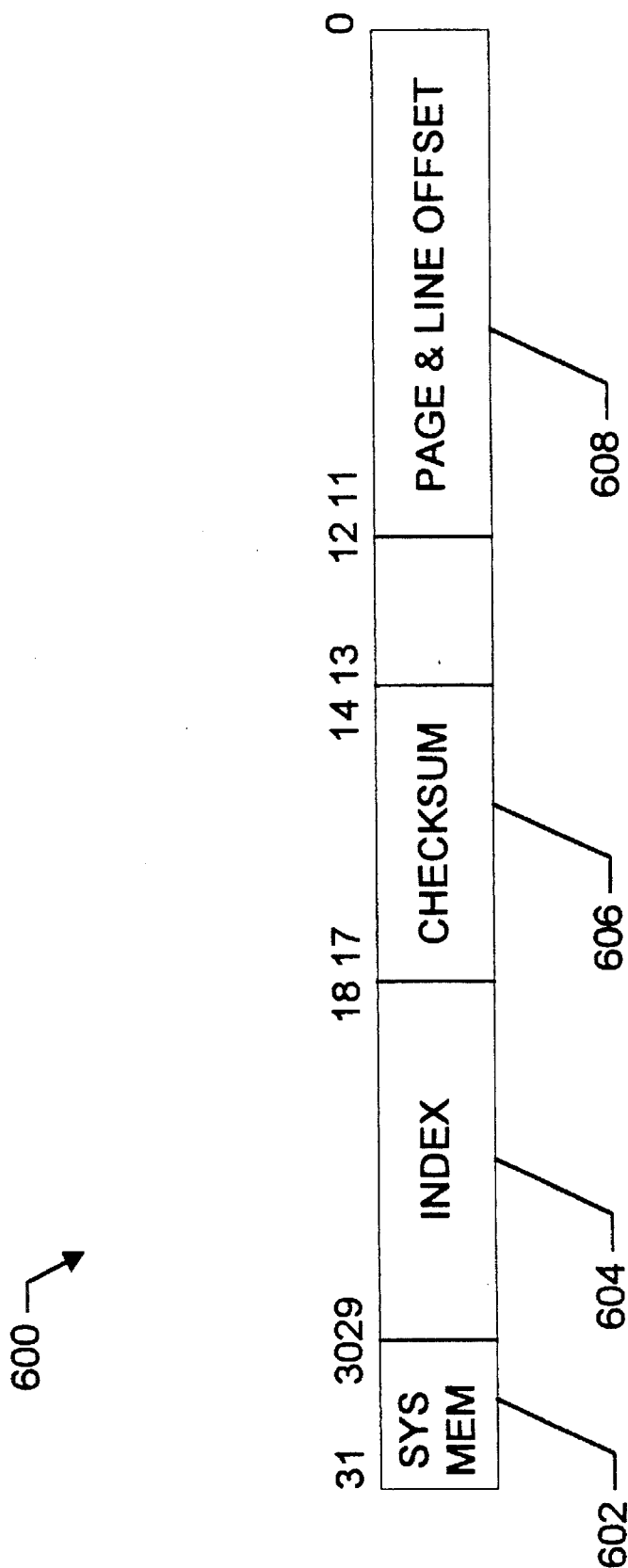
FIG. 6 is a schematic diagram depicting fields of an input/output (I/O) virtual address used in accordance with the novel mapping and protection circuit arrangement.

FIG. 6 is a schematic diagram of an IOVA 600 generated by the IOCs 212 in connection with address information provided by the I/O driver 208 prior to a DMA transaction. The IOVA 600 includes a plurality of fields whose contents are manipulated by the checking mechanisms of the novel mapping and protection circuit arrangement to verify their accuracy prior to executing the transaction with the host memories.

A system memory (SYS MEM) field 602 contains 2 high-order bits that indicate whether mapping is required to translate the IOVA into a system address. An index field 604 contains a 12-bit value for referencing into the mapping table 400 to locate an appropriate mapping table entry 700 and a 12-bit page & line offset field contains a reference to an address in host memories 204 for exchanging data during the DMA transaction.

A checksum field 606 contains a 4-bit checksum value covering the index field 604 to safeguard against an incorrectly generated index. This value is generated by the I/O driver 208 using a conventional checksum algorithm when initializing the IOVA, primarily to reduce the probability of indexing into a valid, but incorrect entry of the mapping table 400.

Figure 7:
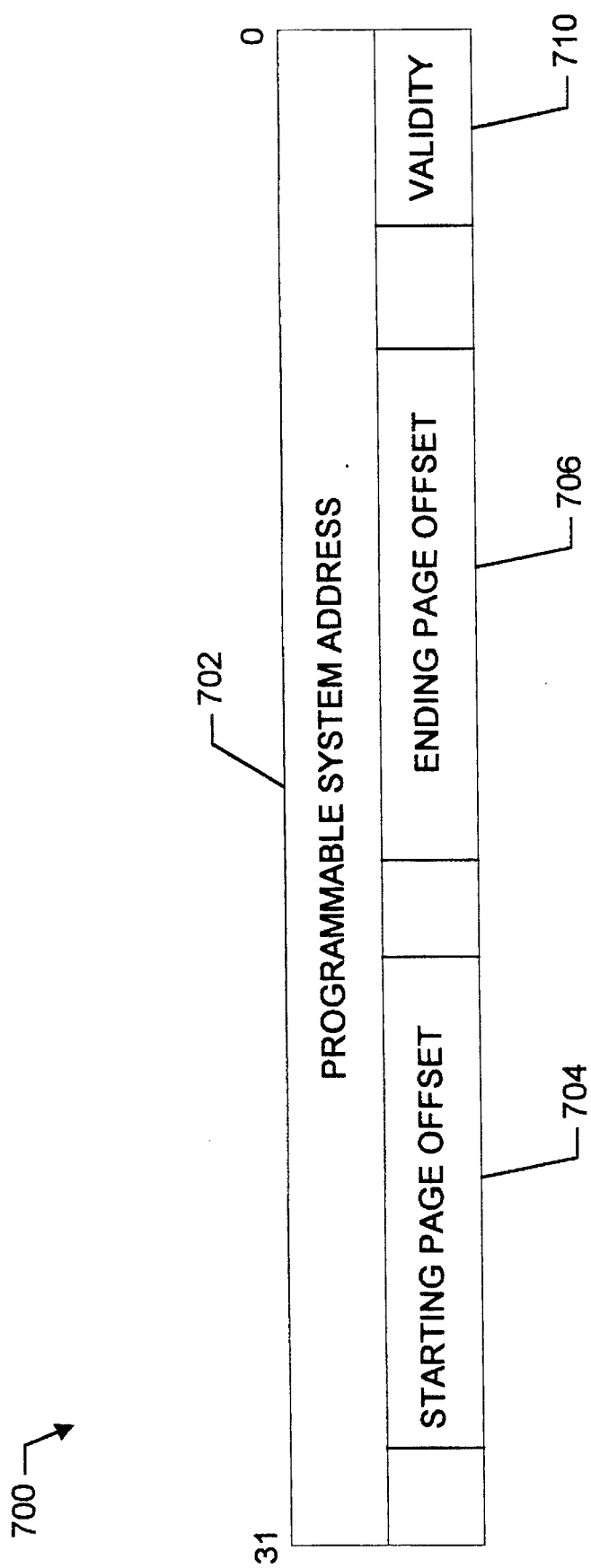
FIG. 7 is a schematic diagram depicting fields of a mapping table entry used in accordance with the novel mapping and protection circuit arrangement.

FIG. 7 is a schematic diagram depicting fields of a mapping table entry 700. A programmable system address field 702 contains the high-order 32-bits of a system address that "points" to the beginning of a particular page in host memory 204. As noted, each mapping table entry also includes a validity bit 710 which provides an indication of whether that mapping table entry is valid. Preferably, the validity bit 710 is contained in the least significant bit (LSB) of the entry 700.

In addition, each entry contains a starting page offset field 704 and ending page offset field 706 that identify a range of addresses within the particular page that are involved in the DMA transaction. Specifically, the starting page offset field 704 contains a 10-bit value representing a "word offset" from the beginning of the page, while the ending page offset field 706 contains a 10-bit value that identifies the last location of the range of addresses.

As noted, each IOC channel 800 (FIG. 3) contains the state machines and registers needed to perform address mapping of the IOVA generated by an IOC 212 and the I/O driver 208. Furthermore, the contents of an IOVA and a mapping table entry are logically manipulated by novel checking mechanisms of the mapping and protection arrangement composed of IOC channel circuitry. In the illustrative embodiment described herein, that circuitry is preferably implemented in an application specific integrated circuit (ASIC). It will be understood to those skilled in the art that the ASIC contains the circuitry required to execute the operations of the novel arrangement described herein, those operations including (1) accesses to the mapping tables, (2) regeneration and comparison of checksums and (3) verification of (i) boundary checks, (ii) mapping table entry validity/invalidity, (iii) sequential read/write memory accesses and (iv) legal byte-enable combinations.

Figure 8:
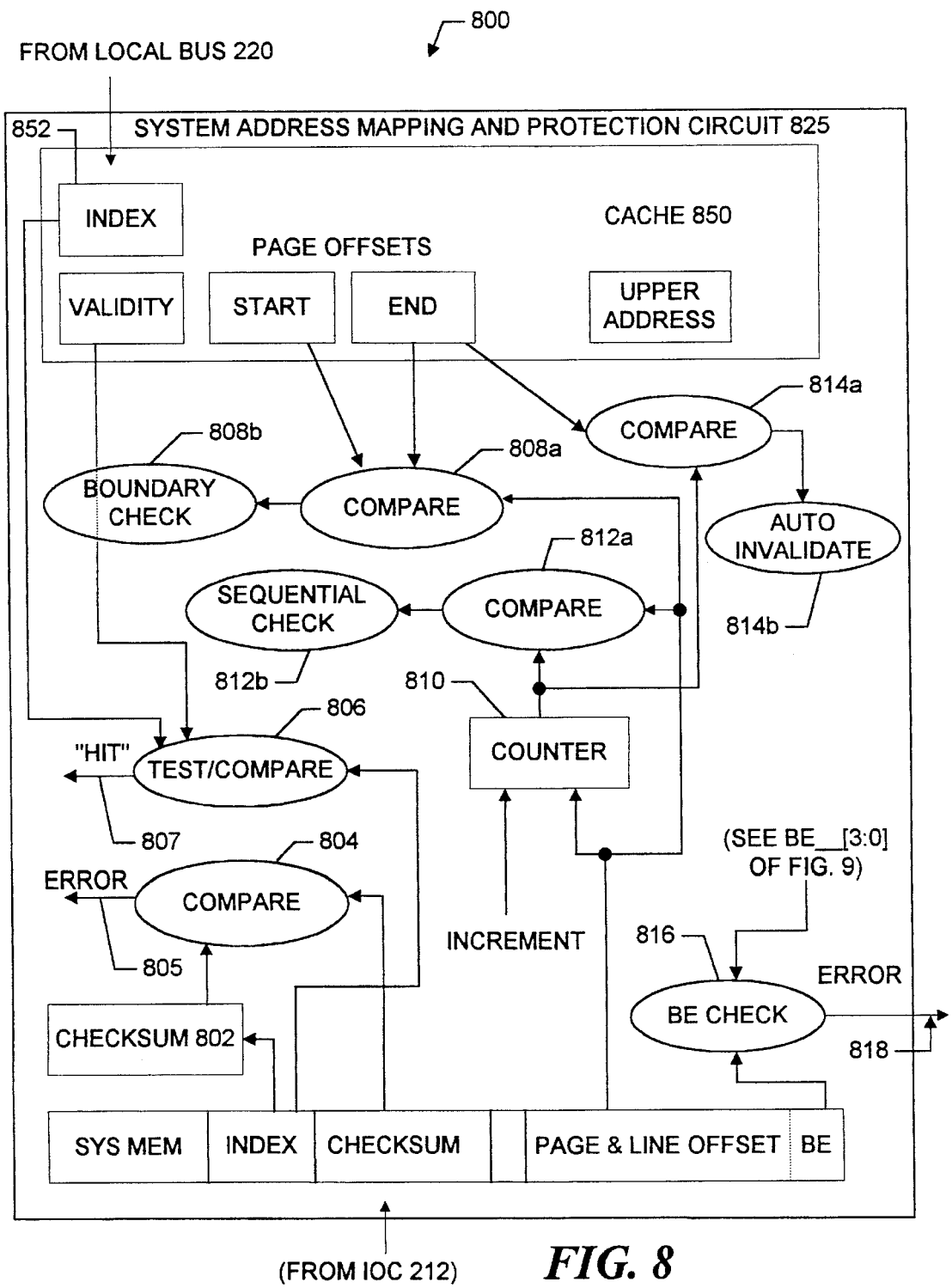
FIG. 8 is a schematic diagram illustrating logical operations performed by the novel mapping and protection circuit arrangement.
Figure 10A:
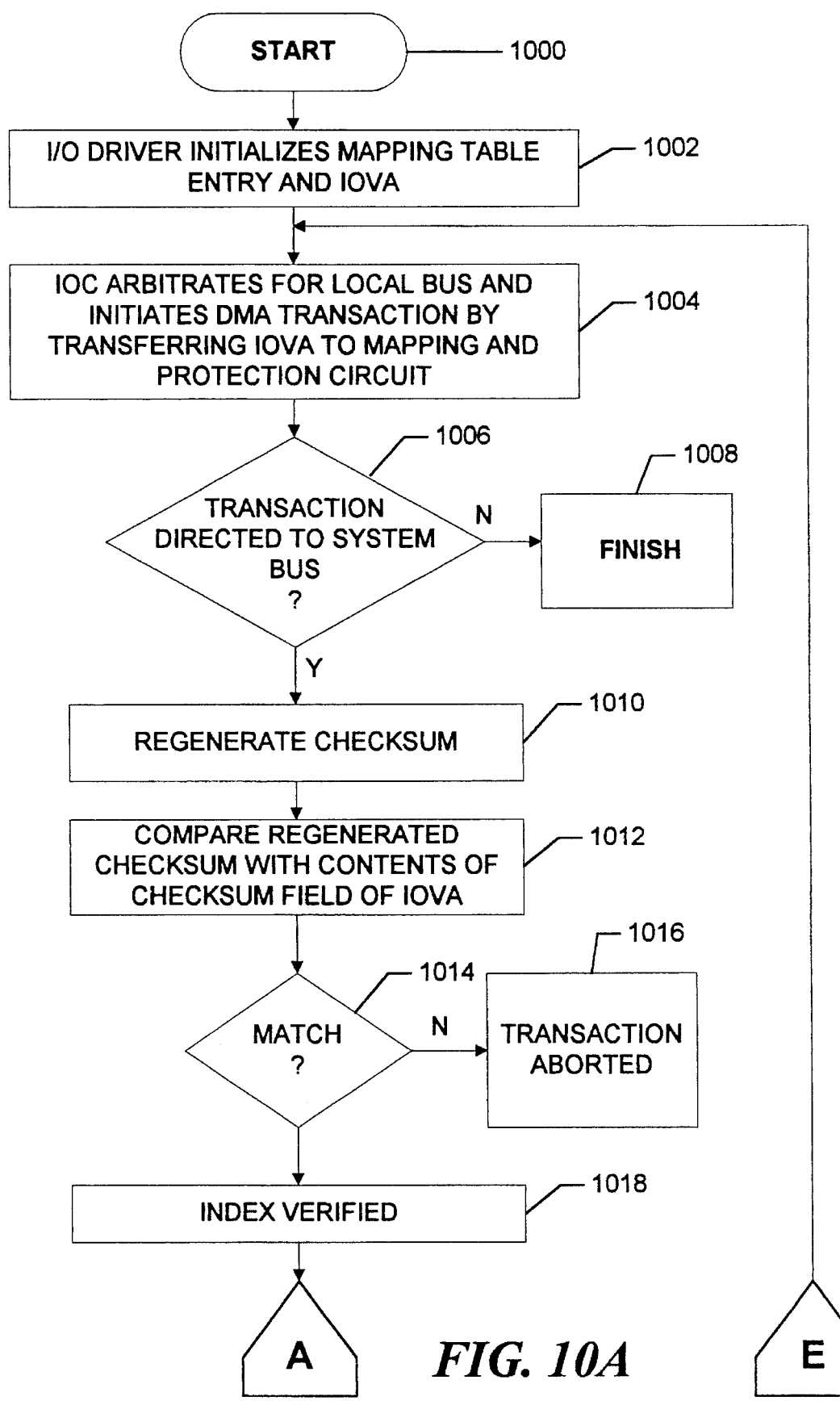
FIGS. 10A–10E are flowcharts illustrating the operation of the novel mapping and protection circuit arrangement during a DMA transaction.
Figure 10B:
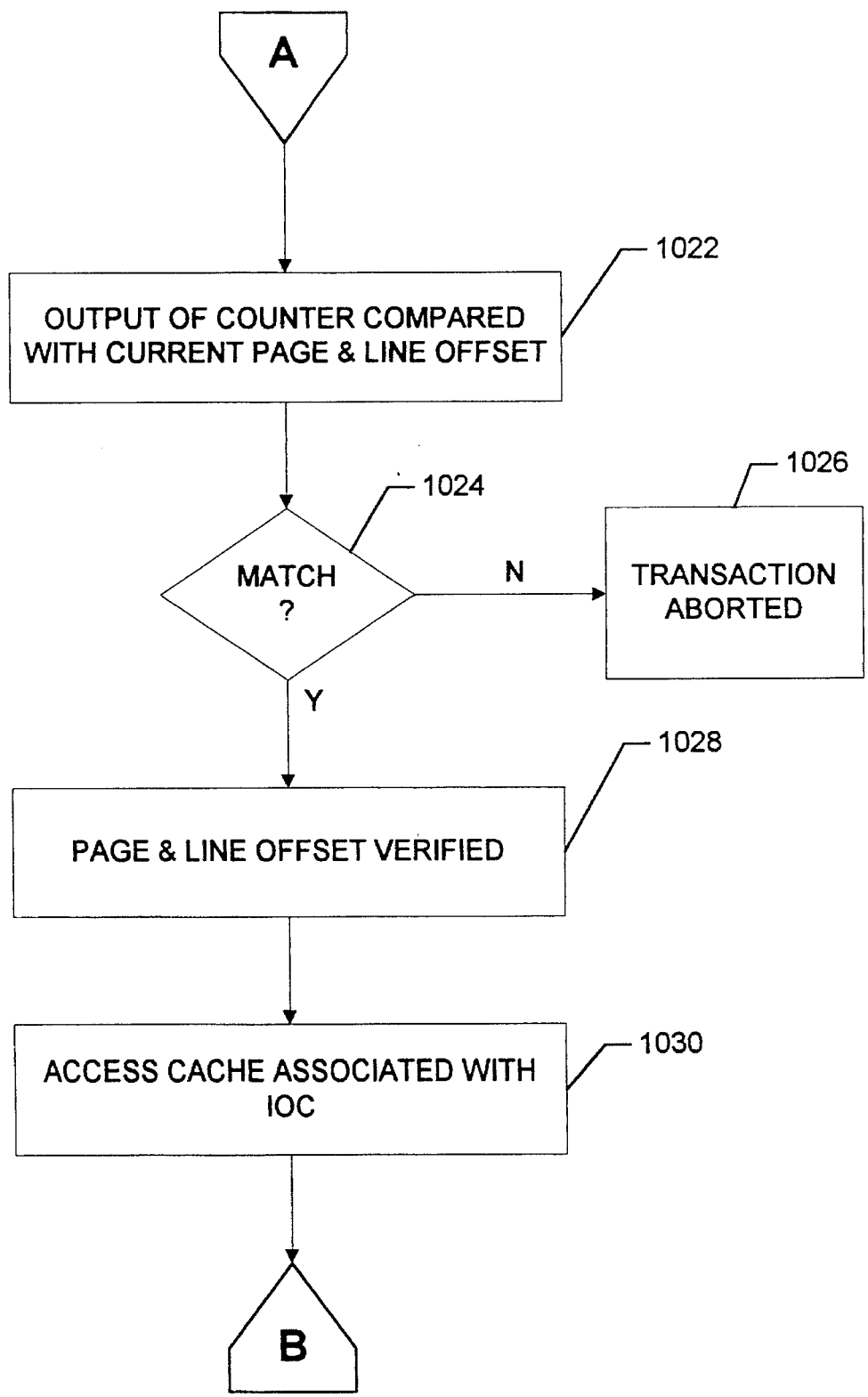
Figure 10C:
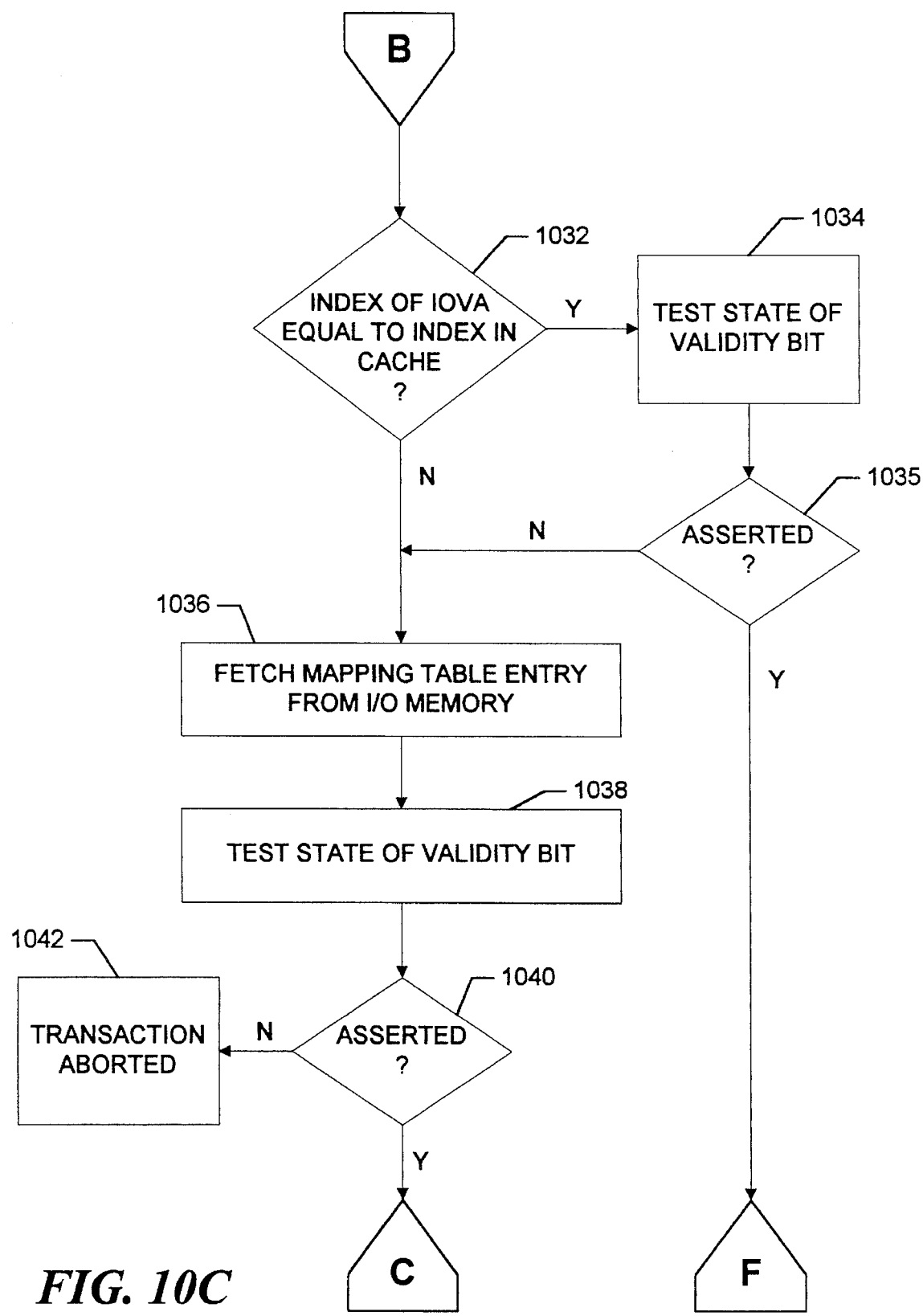
Figure 10D:
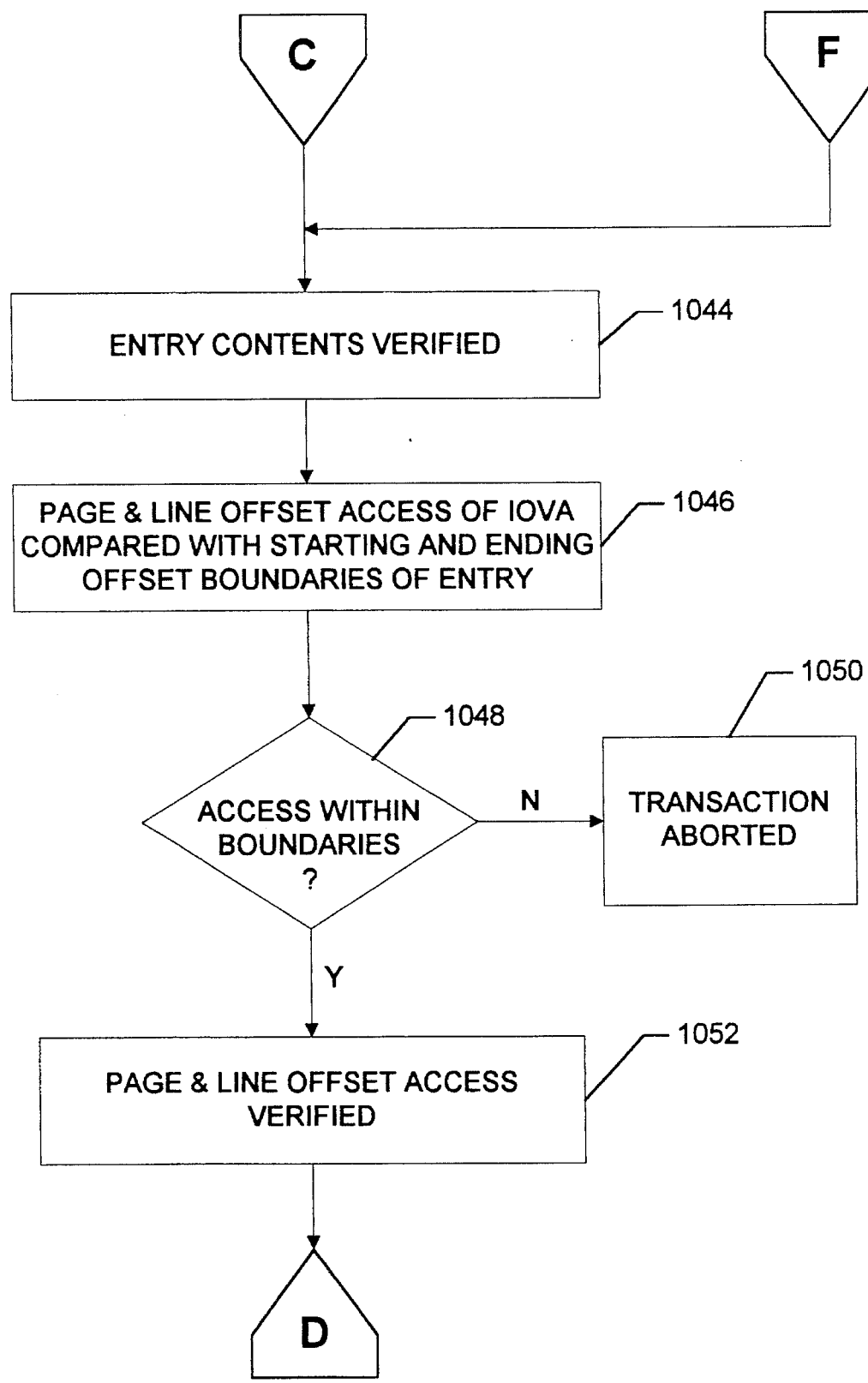
Figure 10E:
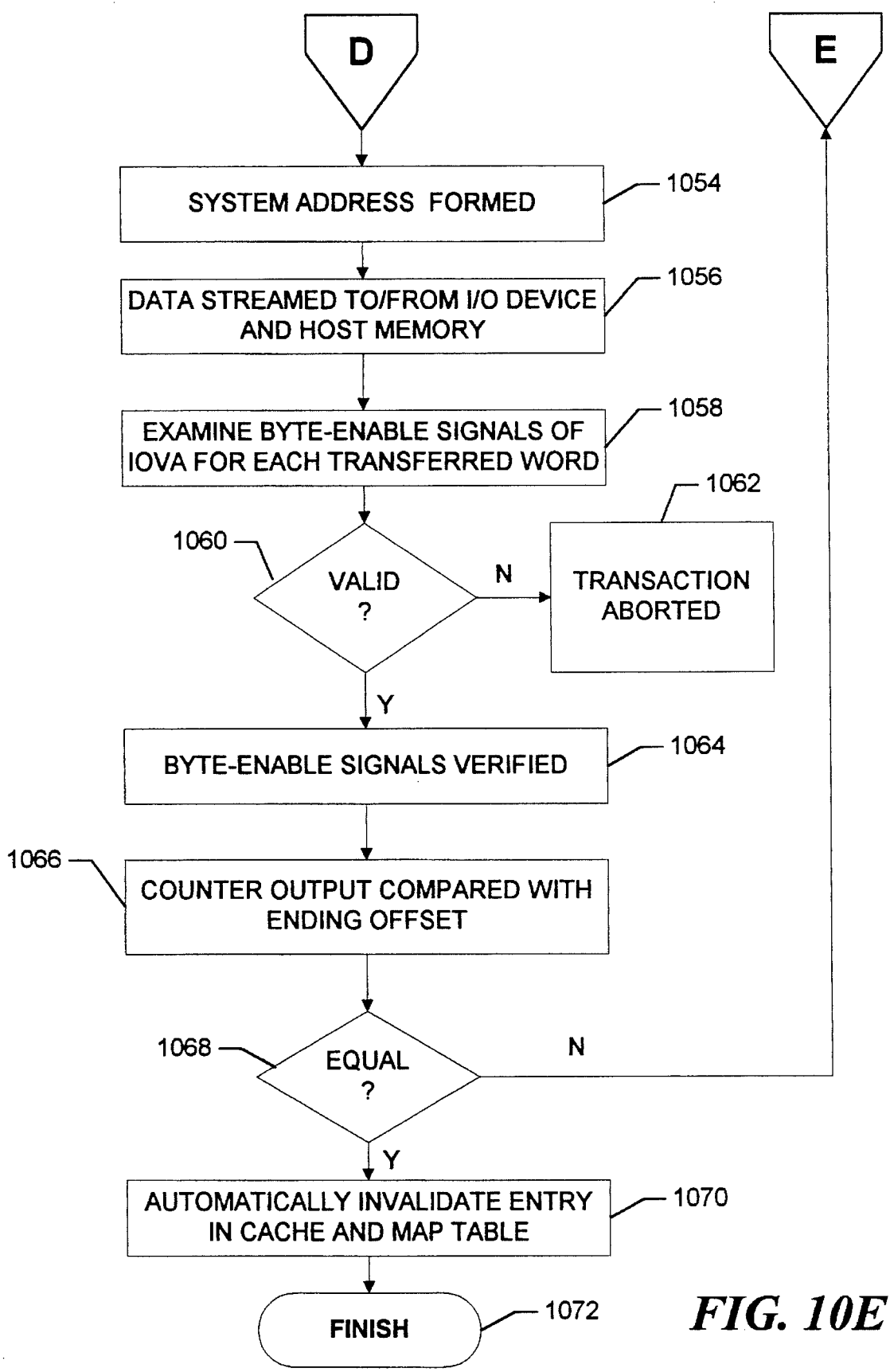

FIG. 8 is a highly schematized diagram of the IOC channel circuitry 800 and the logical operations performed therein. Each IOC channel comprises a system address mapping and protection circuit arrangement 825 and an internal cache 850. As can be seen, the fields of an appropriate valid mapping table entry 700 may be present in the cache 850, along with a "cached" copy 852 of the contents of the IOVA index field used to acquire the valid entry from the mapping table 400; the values of these fields are thereafter apportioned for logical manipulation by the mapping and protection circuit arrangement 825. The presence of these values in the cache 850 is likely to occur if the host memory address associated with the entry is involved in a pending DMA transaction. However, if the valid entry is not present in the cache, the channel circuitry fetches it from the mapping table 400 located in I/O memories 300.

In accordance with a page checking aspect of the present invention, certain checking mechanisms of the arrangement 825 cooperate to ensure that the DMA accesses are directed to correct pages in host memories 204. For example, checksum circuitry (shown schematically at box 802) is employed to regenerate a checksum value from the contents of the index field of the IOVA using the conventional checksum algorithm. The regenerated value is then compared with the contents of the IOVA checksum field, as shown schematically at 804. This checking mechanism produces an error on line 805 if the values do not match, thus indicating that the IOVA may be incorrect.

A match, however, verifies the integrity of the index and allows for execution of a cooperating mechanism that tests the state of the validity bit of the mapping table entry along with comparing the contents of the IOVA index field with the cached index value 852. This mechanism is schematically illustrated at 806. If the validity bit is asserted and if the indexes match, a testing/comparing circuit of the IOC channel produces a "hit" on line 807 indicating a valid mapping table entry.

Once it is established that the correct page in host memory is identified, further checking mechanisms are provided to ensure that memory access operations are performed at correct locations within the page. As noted, the page table entry contains starting and ending page offsets within a particular page, while the IOVA includes a page & line offset pointing to an address in host memory for executing the DMA transaction.

In accordance with a "boundary" checking mechanism, the page & line offset is compared with the starting and ending offsets. This comparator mechanism, illustrated schematically at 808a,b (hereinafter 808), functions to verify that the memory access is within these starting and ending boundaries by testing whether the page & line offset is greater than or equal to the starting offset, and whether it is less than or equal to the ending offset.

The boundary checking mechanism is significant because an incorrect bit within the page & line offset field of the IOVA would not be detected by the checksum and validity bit tests. However, if the attempted memory location access is outside the starting and ending boundaries, this mechanism would discover that incorrect offset address.

Data accesses to a disk are predictable since an access typically starts at the beginning of a sector and, thereafter, data is read sequentially until the end of the sector or to an ending I/O address. Likewise, accesses to memory locations during a DMA transaction typically occur sequentially from an initial address to an ending address without skipping or overwriting any intervening address locations.

According to a "sequential access" checking aspect of the invention, the initial page & line offset is loaded into a counter 810 of the channel circuitry 800 which increments upon each transferred word (i.e., 4 bytes) so as to operate in tandem with the current page & line offset value. As the data is read/written, the output of the counter should equal the current offset because the data is read/written sequentially. A sequential checking comparator mechanism, shown schematically at 812a,b (hereinafter 812) compares the output of the counter with the current page & line offset and, if a match ensues, further verifies the integrity of that page & line offset value.

Moreover, two additional checking mechanisms are provided to verify the accuracy of generated I/O addresses. The host memories 204 are byte-addressable memories and the two LSBs [1:0] of the IOVA represent byte-enable (BE) signals. Preferably, the IOC translates a byte-aligned, generated address into a word-aligned address plus four (4) byte-enable signals, e.g., be_[3:0] to facilitate interfacing with the host memories. Specifically, these byte-enable signals are defined by the generated address in combination with the data length of the memory access. For example, assume the IOC wishes to perform the following data length access at the following addresses:

| data length | address |
|---|---|
| word | 4000_0000 |
| byte | 4000_0001 |
| half_word | 4000_0002 |
| byte | 4000_0003 |
| byte | 4000_0000 |

The IOC then issues the following generated addresses together with the following byte-enable signals:

| address [31:2] | be_[3:0] |
|---|---|
| 4000_0000 | 0000 |
| 4000_0000 | 1101 |
| 4000_0000 | 0011 |
| 4000_0000 | 0111 |
| 4000_0000 | 1110 |

Address bits [31:2] together with be_[3:0] are then passed from the IOC to the mapping and protection circuit, with address bits [1:0] implied to be zeros (i.e., word-aligned).

Figure 9:
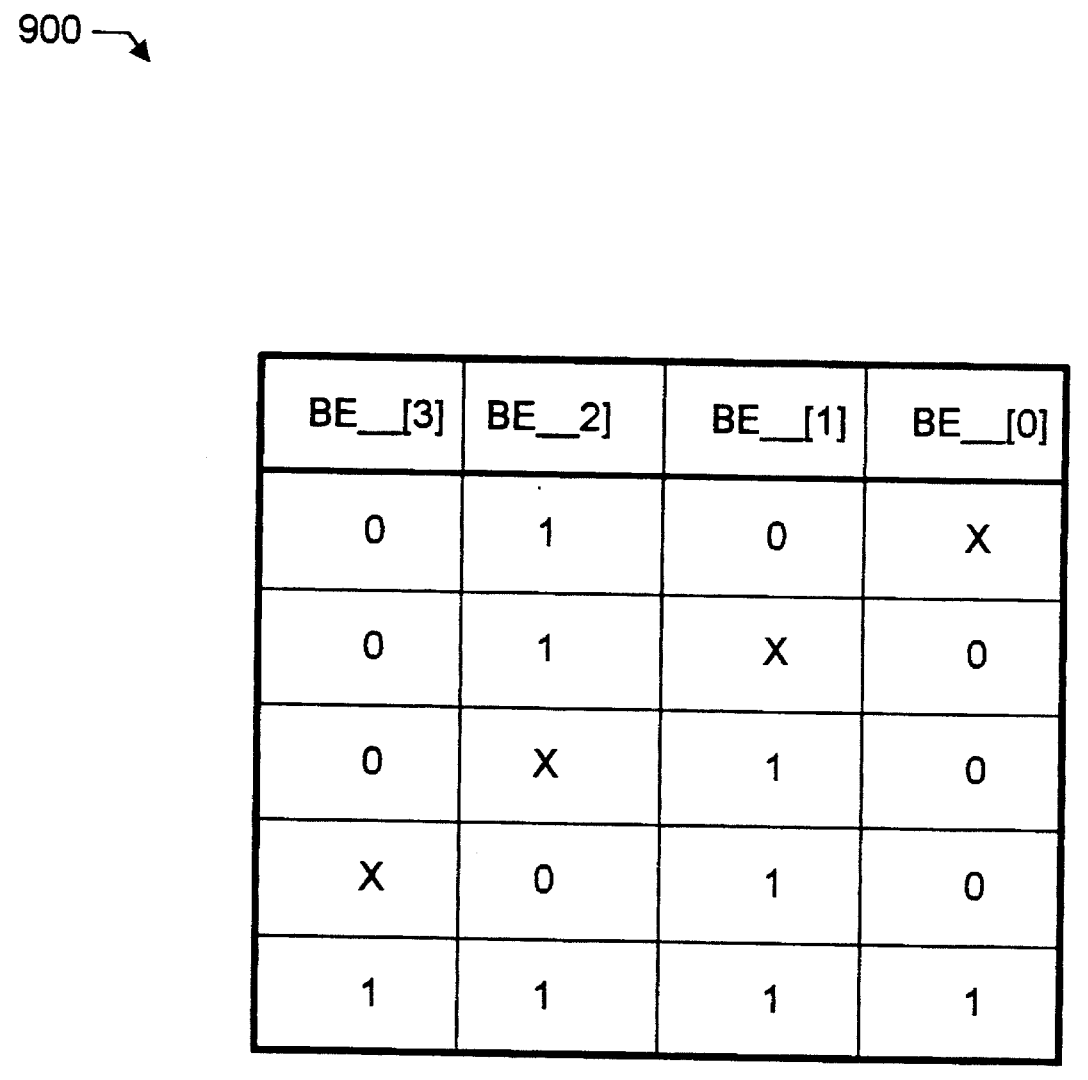

A byte-enable checking mechanism of the present inventive arrangement (shown schematically at 816) examines these byte-enable signals to ensure that they represent valid combinations for each word or partial word transferred. FIG. 9 is a table 900 showing an example of some illegal byte-enable combinations which are tested by appropriate IOC channel circuitry.

Upon successful completion of the sequential DMA accesses from the specified starting page offset to the ending page offset, an "auto-invalidate" mechanism automatically invalidates the mapping table entry and cached entry, as shown schematically at 814a,b (hereinafter 814). The auto-invalidate mechanism comprises circuits for comparing the counter output value to the ending page offset value. If these values match, the IOC has completed the last read or write operation of the DMA transaction and the validity bit 710 may be de-asserted by the channel circuitry. Advantageously, this mechanism provides a performance enhancement by obviating the need for software intervention to invalidate the entry in addition to preventing further access by the IOC to that index location.

Operation of the novel mapping and protection circuit arrangement during a DMA transaction will now be described in connection with the flowcharts of FIGS. 10A–10E. The process starts in Step 1000 and proceeds to Step 1002 where the I/O driver initializes a mapping table entry in anticipation of a subsequent DMA transaction. Additionally, the I/O driver sets up the IOVA, including generation of the checksum value contained in the checksum field.

In Step 1004, an IOC arbitrates for the local bus 220 and, upon gaining access, initiates a DMA transaction by transferring the IOVA to the IOC channel of the mapping and protection circuit 400. Using the SYS MEM field of the IOVA, the channel circuitry determines whether the transaction is directed to the system bus 206 in Step 1006. If it is not, the channel circuitry takes no further action and the process finishes in Step 1008; otherwise, in Step 1010, the checksum is regenerated from the contents of the index field and compared with the contents of the IOVA checksum field in Step 1012. If it is determined in Step 1014 that the contents do not match, an error is generated and in Step 1016 the transaction is aborted. If a match ensues, however, the integrity of the index is verified in Step 1018.

The initial page & line offset of the DMA transaction is loaded into a counter and the counter increments upon each transferred word so as to operate in tandem with the current page & line offset. The output of the counter is compared with the current page & line offset in Step 1022 and, if a match (Step 1024) ensues, the integrity of the page & line offset is verified in Step 1028; otherwise, the transaction aborts in Step 1026.

In Step 1030, the channel circuitry accesses the cache associated with the IOC and, in Step 1032, the index of the IOVA is compared with the index stored in the cache. If there is a match, a transaction may be pending and the state of the validity bit of the cache entry is tested as indicated in Step 1034. If the bit is not asserted (Step 1035), the process proceeds to Step 1036; otherwise, the contents of the cache entry are valid and the routine skips to Step 1044.

If the index of the IOVA does not match the cache entry index, then the IOC is starting a new transaction and the channel circuitry fetches an entry from the mapping table (Step 1036) corresponding to that index. In Step 1038, the state of the mapping table entry validity bit is tested to determine the integrity of that entry's contents. If the bit is not asserted (Step 1040), the contents are invalid and the transaction aborts in Step 1042. If the bit is asserted, the contents of the entry contain valid data (Step 1044).

In Step 1046, the page & line offset (access) of the IOVA is compared with the starting and ending boundary offsets of the entry. If the page & line offset is greater than or equal to the starting offset, and if it is less than or equal to the ending offset, i.e., the access is within the required boundaries as indicated in Step 1048, then the accuracy of the page & line offset access is verified (Step 1052); otherwise, the transaction aborts in Step 1050.

In Step 1054, the contents of the programmable system address field of the mapping table entry are combined with the contents of the page & line offset field to create the system address in host memory. In Step 1056, the DMA transaction proceeds and data is streamed to/from the I/O device and host memory. Thereafter, in Step 1058, the byte-enable signals of the IOVA are examined for each transferred word to determine whether they represent valid (Step 1060) combinations. If so, those signals are verified in Step 1064; otherwise, the transaction aborts in Step 1062.

In Step 1066, the output of the counter is compared with the ending page offset to determine if the transaction has completed. If they are equal (Step 1068), the validity bits of the mapping table entry in both the cache and mapping table are deasserted in Step 1070, thereby automatically invalidating the entry. Otherwise, the process returns to Step 1004. The routine then finishes in Step 1072.

Figure 11:
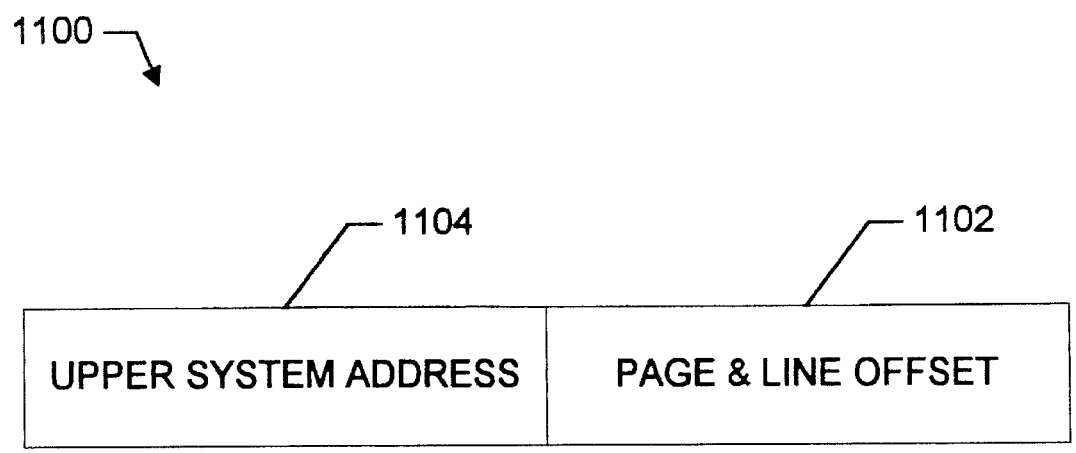
FIG. 11 is a schematic diagram depicting fields of a translated host memory system address that is verified in accordance with the mapping and protection circuit arrangement of the present invention.

FIG. 11 depicts the fields of the translated host memory system address 1100 that are formed from the contents of the IOVA and mapping table entry and, additionally, that have been verified in accordance with the mapping and protection circuit arrangement of the invention. Specifically, the 48-bit system address comprises a page & line offset field 1102 (obtained from the IOVA 600) appended to an upper system address field 1104 (obtained from the mapping table entry 700).

Accordingly, it has been shown and described that the novel checking mechanisms of the present invention provide fast and efficient verification of the IOVA 600 and the mapped system address 1100 without the need for discrete redundant checking circuits. Individually, these mechanisms operate to verify portions of the generated IOVA and system addresses, while collectively, they provide total protection of host memory from corruption due to incorrect I/O information transfer during DMA transactions.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description as shown in the accompanying drawing shall be interpreted as illustrative and not in the limiting sense. It is also to be understood that the following claims are intended to cover all of the generic and specific features of the invention described herein.

What is claimed is:

1. A method for verifying the accuracy of an input/output (I/O) virtual address (IOVA) generated by an I/O controller of a fault-tolerant computer in anticipation of a direct memory access (DMA) transaction between a host memory and the I/O controller, the method comprising the steps of:

apportioning the IOVA into a plurality of fields including a page & line offset field having two least significant bits comprising byte-enable bits;

translating said byte-enable bits into byte-enable signals;

comparing states of said byte-enable signals with contents of a byte-enable combination table; and verifying the states of said byte-enable signals in response to a non-match in said comparing step.

2. Apparatus for verifying the accuracy of an input/output (I/O) virtual address (IOVA) generated by an I/O controller of a fault-tolerant computer in anticipation of a direct memory access (DMA) transaction between a host memory and the I/O controller, the apparatus comprising:

means for apportioning the IOVA into a plurality of fields including a page & line offset field having two least significant bits comprising byte-enable bits;

means, coupled to said apportioning means, for translating said byte-enable bits into byte-enable signals;

means, coupled to said translating means, for comparing the states of said byte-enable signals with contents of a byte-enable combination table; and means for verifying the states of said byte-enable signals in response to said comparing means producing a non-match.

* * * * *